United States Patent [19]

Watanabe

[11] Patent Number: 4,672,394
[45] Date of Patent: Jun. 9, 1987

[54] IMAGE BUILDING APPARATUS

[75] Inventor: Junji Watanabe, Yokohama, Japan

[73] Assignee: Kabushiki Kaisha Toshiba, Kawasaki, Japan

[21] Appl. No.: 758,749

[22] Filed: Jul. 25, 1985

[30] Foreign Application Priority Data

Jul. 27, 1984 [JP] Japan .............................. 59-156719

[51] Int. Cl.⁴ ............................................ G01D 15/10
[52] U.S. Cl. ................................ 346/76 PH; 400/120; 400/323; 346/106
[58] Field of Search ................ 346/76 PH, 105–106; 400/120, 207–208.1, 233, 323; 214/216 PH; 242/194, 569, 58

[56] References Cited

U.S. PATENT DOCUMENTS 4,496,455  1/1985  Maeyama ..................... 346/76 PH

OTHER PUBLICATIONS

IBM Tech Disc. Bul, vol. 23, No. 9, Feb. 81, Crooks et al, p. 4298.

*Primary Examiner*—Arthur G. Evans
*Attorney, Agent, or Firm*—Schwartz, Jeffery, Schwaab, Mack, Blumenthal & Evans

[57] ABSTRACT

An improved image building apparatus of the type in which a required image is built on a sheet of printing medium by thermally transferring coloring agent on a strip of ink donor medium by means of a printing head. An additional ink donor medium holding means in which a shorter length of ink donor medium than that of a conventional one is spanned between two cores is provided. In the case where there is a requirement for protecting against disclosure of secret items the additionally provided ink donor medium holding means is used to build an image.

16 Claims, 28 Drawing Figures

FIG. 14(a)
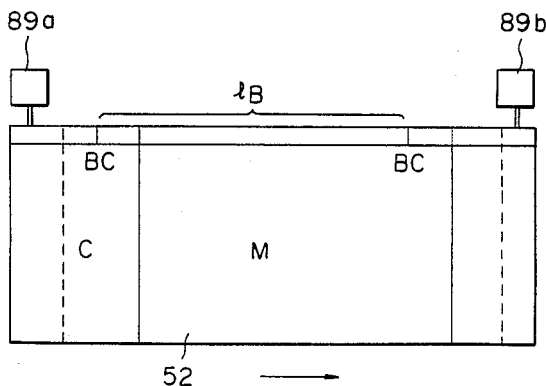
FIG. 14(b)
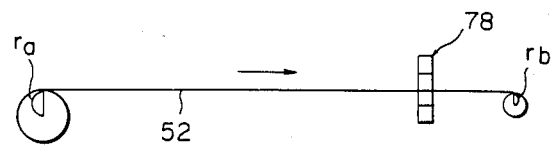
FIG. 15(a)
| COUNT NO. | CONTROL INFORMATION | |
|---|---|---|
| | 89a | 89b |
| 117 | 6H | 9H |
| 116 | ↓ | ↓ |
| 83 | 5H | 9H |
| ↓ | ↓ | ↓ |
| 52 | | |
| 51 | 1H | DH |
FIG. 15(b)
| COUNT NO. | CONTROL INFORMATION | |
|---|---|---|
| | 89a | 89b |
| 117 | DH | 1H |
| 116 | ↓ | ↓ |
| 83 | CH | 2H |
| ↓ | ↓ | ↓ |
| 52 | | |
| 51 | 9H | 6H |
FIG. 15(c)
| COUNT NO. | CONTROL INFORMATION | |
|---|---|---|
| | 89a | 89b |
| 117 | AH | 5H |
| 116 | ↓ | ↓ |
| 83 | 9H | 6H |
| ↓ | ↓ | ↓ |
| 52 | | |
| 51 | 5H | AH |
FIG. 15(d)
| COUNT NO. | CONTROL INFORMATION | |
|---|---|---|
| | 89a | 89b |
| 117 | OH | 9H |
| 116 | ↓ | ↓ |
| 83 | OH | BH |
| ↓ | ↓ | ↓ |
| 52 | | |
| 51 | | FH |

CONVENTIONAL RIBBON CASSETTE | SMALL VOLUME TYPE RIBBON CASSETTE

IMAGE BUILDING APPARATUS

BACKGROUND OF THE INVENTION

1. Field of the Invention

The present invention relates to an image building apparatus of the type in which a required image is built on a sheet of printing medium by transferring coloring agent on a strip of ink donor medium onto the printing medium by means of a printing head and more particularly to improvement of an image building apparatus of the above-mentioned type in which the ink donor medium is spanned between two cores.

2. Description of the Prior Art

For instance, a thermal transferring type image building apparatus will be noted as one of transferring type image building apparatuses. The thermal transferring type image building apparatus uses ink donor medium in the form of thermal transfer ribbon on which a thermally fusible or thermally sublimable coloring agent is coated and the recording head is generally constructed in the form of a thermal head. Since this type of image building apparatus is designed and constructed with relatively small dimensions at an inexpensive cost and with generation of noise reduced remarkably and moreover since plain paper can be used as a printing medium, it is increasingly put in practical use in recent years not only as an output recorder for a computer, word processor or the like apparatus but also as a copying apparatus.

However, the conventional image building apparatus of the early-mentioned type in which transferring is effected by fusing ink on the thermal transfer ribbon by heating and then transferring molten ink on a sheet of recording medium has a problem that the content of transference is left behind on the thermal transfer ribbon in the form of negative image. For the reason, there is a necessity for keeping the content of the transference secret in some case.

For instance, in the case where copying service is rendered at a copy shop, a requirement is raised from a client that he wants to carry back the used thermal transfer ribbon after completion of transferring operation for the purpose of keeping the content of transference secret. To meet the requirement the copy shop usually uses a new thermal transfer ribbon to carry out subsequent transferring and gives the used thermal transfer ribbon to him after completion of transferring operation at a reasonable cost. However, in the case where copying service is rendered for a small number of sheets of printing medium there appears a problem that the used thermal transfer ribbon is handed over to him with a considerably long part of the thermal transfer ribbon left unused, resulting in the selling price of the used thermal transfer ribbon becoming expensive.

SUMMARY OF THE INVENTION

Hence, the present invention has been made with the foregoing background in mind.

It is an object of the invention to provide an image building apparatus of the early-mentioned type which assures that a requirement for protecting disclosure of the content of transference is satisfactorily met at an inexpensive cost without any necessity for changing or modifying the control system for reciprocably running a strip of ink donor medium.

To accomplish the above object there is proposed according to the invention an image building apparatus of the early-mentioned type essentially comprising first ink donor medium holding means (in the form of a conventional thermal transfer ribbon cassette) in which a first ink donor medium is accommodated in such a manner that both ends of the first ink donor medium are wound about two cores while it is spanned therebetween, second ink donor medium holding means (in the form of a small volume type thermal transfer ribbon cassette) in which a second ink donor medium is accommodated in such a manner that both ends of the second ink donor medium are wound about two cores while it is spanned therebetween, the second ink donor medium having a length shorter than that of the first ink donor medium, ink donor medium running control means for controlling running of the first or second ink donor medium which is accommodated in the first or second ink donor holding means which is selected so as to allow one of them to be fitted to the image building section of the apparatus, printing medium running control means for controlling running of the printing medium while it is juxtaposed adjacent to the first or second ink donor medium in the overlapped state, and a recording head for transferring coloring agent on the first or second ink donor medium onto the printing medium with the aid of the ink donor medium running control means while they are caused to run in the overlapped state whereby a required image is built on the printing medium.

Namely, the present invention consists in that a thermal transfer ribbon having a length shorter than the length of a conventional one is additionally provided, and when a requirement for keeping the content of transference in secret is raised from a client, the additionally provided thermal transfer ribbon is used in place of the conventional use.

When a diameter of cores in the second ink donor medium holding means is determined, consideration is taken in such a manner that diameters of respective cores in the second ink donor medium holding means and the length of the second ink donor medium are so determined that diameters of the respective wound structures of ink donor medium in the second ink donor medium holding as measured at a certain wound state are equal to diameters of the corresponding wound structures in the first ink donor holding means as measured at a certain wound state.

According to the invention there is no necessity for changing or modifying the control system for controlling running of the ink donor means in dependence on the case when the first ink donor medium holding means is fitted to the image building section of the apparatus and the case when the second ink donor medium holding means is fitted to the same. As a result, a requirement for keeping the content of transference in secret can be satisfactorily met at an inexpensive cost.

Further, according to the invention the driving system for driving the first ink donor medium holding means can be used also as a driving system for driving the second ink donor medium holding means. Further, according to the invention the driving system for driving the first ink donor medium holding means can be used also as a driving system for driving the second ink donor medium holding means.

Further, according to the invention it is possible to determine a diameter of both cores in the second ink donor medium holding means to the same dimension whereby the torque condition in both the normal and reverse directions of ink donor medium is kept the same.

Other objects, features and advantages of the invention will become more clearly apparent from reading of the following description which has been prepared in conjunction with the accompanying drawings.

BRIEF DESCRIPTION OF THE DRAWINGS

The accompanying drawings will be briefly described below.

FIG. 14(a) is a plan view schematically illustrating a system for detecting a diameter of the wound structure of thermal transfer ribbon.

FIG. 14(b) is a side view of the system in FIG. 14(a).

FIGS. 15(a) to (d) are a table respectively, illustrating how the content of informations stored in a read only memory is represented in the form of table.

DESCRIPTION OF THE PREFERRED EMBODIMENT

Now, the present invention will be described in a greater detail hereunder with reference to the accompanying drawings which schematically illustrate an image building apparatus in accordance with an embodiment of the invention.

Figure 1:
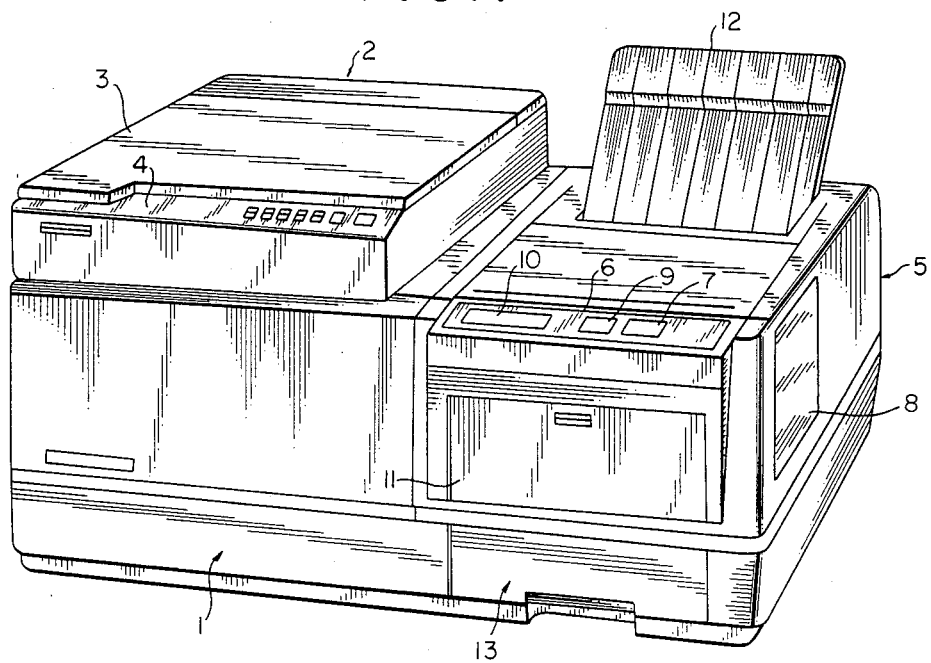
FIG. 1 is a perspective view of an image building apparatus in accordance with the invention, particularly illustrating the outer appearance of the apparatus.

FIG. 1 is a perspective view illustrating the whole appearance of the apparatus. An image information reading unit 2 is detachably mounted on the upper surface of a housing 1 of the apparatus. The image information reading unit 2 is provided with an original cover 3 adapted to be opened and closed as required by its turning movement and an original holding board (not shown) made of transparent glass is placed below the original cover 3 to hold an original thereon. The image information reading unit 2 is intended to optically scan the original on the original board by allowing a scanner section comprising a lighting system (which will be described in more details later) to reciprocably move along the bottom surface of the original board and then convert thus scanned optical information into electrical signals. A control panel 4 is disposed on the upper fore part of the image information reading unit 2. Electrical signals photoelectrically converted in the image information reading unit 2 in that way are transmitted to an image building section 5 which is removably mounted on the housing 1 at the position located rightwardly of the image information reading section 2 as seen in the drawing. Thus, a required image is built on printing medium in the form of a sheet of paper in the image building section 5 in response to thus converted signals. A control panel 6 is disposed on the upper fore part of the image building section 5. Specifically, the control panel 6 includes an on-line scanner key 7 for selecting the image information reading unit 2 on the housing 1, an eject key 9 adapted to be operated when ink donor medium in the form of a thermal transfer ribbon is taken out of the door 8 on the righthand side wall of the image building section 5 and a display 10. Further, the image building section 5 is provided with a guide section 11 on the front wall thereof which is adopted to open when paper is manually fed into the interior of the image building section 5 and moreover it is provided with a paper receiving tray 12 on the upper rear part thereof on which papers are received after completion of image transference. A paper feeding cassette 13 in which a number of papers are accommodated is detachably fitted into the housing 1 at the position located below the image building section 5.

Figure 2:
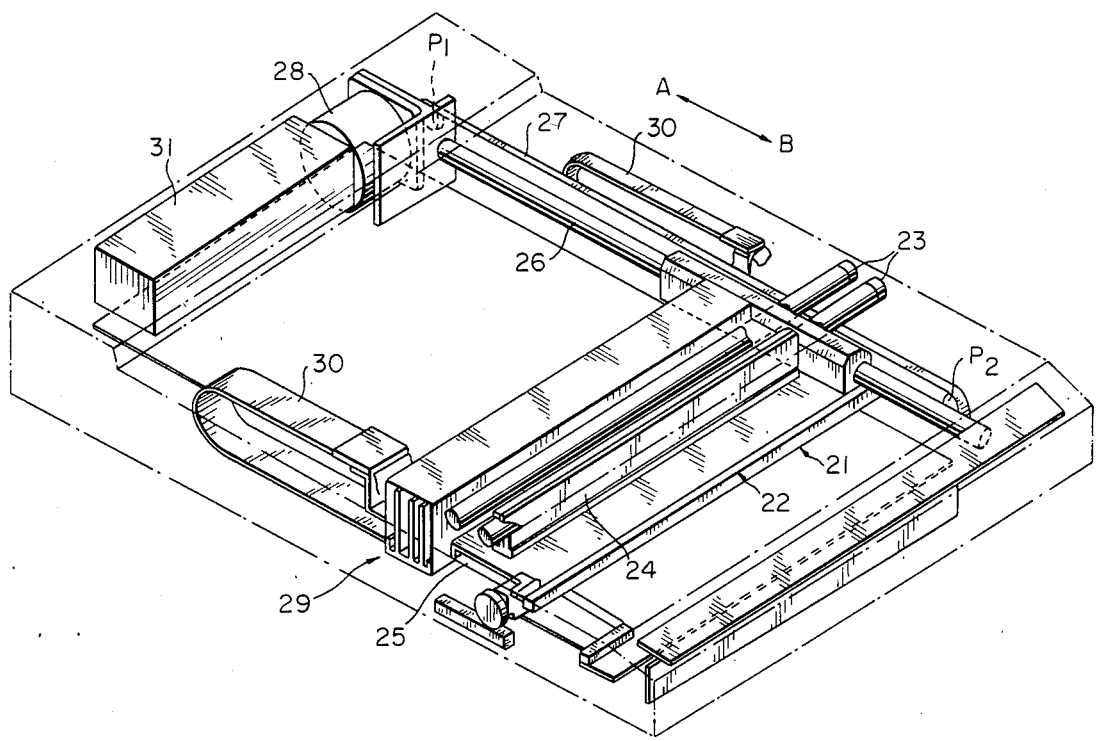
FIG. 2 is a perspective view of an image information reading unit in the apparatus of the invention.

Next, in FIG. 2 is shown a schematic perspective view of the image information reading unit. Two light sources 23 arranged parallel to one another are carried on a carriage 22 constituting the scanner section 21, and two lenses 24 having the inverted V-shaped sectional configuration are attached to the light sources 23 while extending across the whole length of the latter. A photoelectric convertor 25 comprising color CCD is disposed at the lower end of the lenses 24. As is apparent from the drawing, the carriage 22 has a guide shaft 26 at the one end part thereof which is inserted therethrough so that the carriage slidably moves on it, and an endless timing belt (toothed belt) 27 extending along the guide shaft 26 in the stretched state is fixedly secured to the carriage 22. The timing belt 27 is driven by means of a pulse motor 28. Namely, the timing belt 27 is stretched between a motor pulley $P_1$ disposed on the rotational shaft of the pulse motor 28 and an idle pulley $P_2$ so that the scanner section 21 is displaced in the direction as identified by an arrow mark A or B in dependence on the direction of movement of the timing belt 27. In the drawing reference numeral 29 designates a printed base board with A/D converting section and other components mounted thereon, the A/D converting section serving to convert output signals from the photoelectric convertor 25 into digital signals, and reference numeral 30 does a flat cable by way of which electricity outputted from an invertor is supplied to the light sources 23 and signals processed by circuits on the printed base board are transmitted to the image building section 5.

Figure 3:
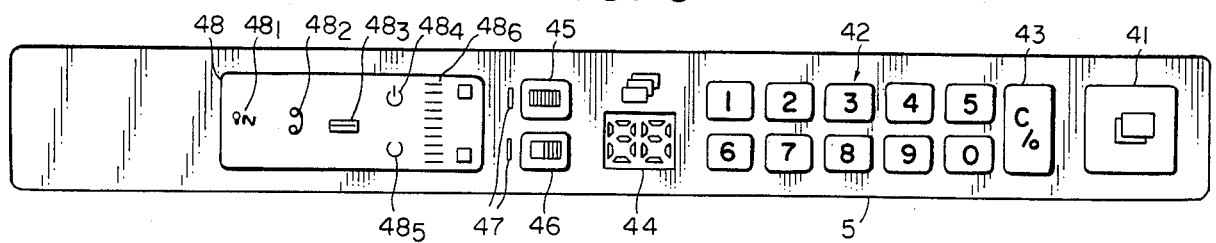
FIG. 3 is a plan view of a control panel as seen from the above.

FIG. 3 is a plan view of the control panel for the image information reading unit 2 as seen from the above. As is apparent from the drawing, the control panel 4 includes a print key 41 for commanding starting of printing operation, ten keys 42 for specifying the number of papers to be printed and other items, a clear stop key 43 for commanding clearing of the specifying of the number of papers to be printed and stoppage of the printing operation, a seven segment display 44 for displaying the number of papers to be printed and other items, an intermediate mode key 45 for determining an intermediate mode comprising a combinations of all available colors and its optical density, a two value mode key 46 for specifying one of two value modes comprising a mode corresponding to a monochromatic color and a mode corresponding to a combination of seven colors as well as their optical density, a mode display 47 for displaying a selected mode key and a display play 48 for displaying a variety of items. Specifically, the last mentioned display 48 includes a jamming display portion $48_1$ adapted to be turned on in the event of an occurrence of paper jamming in the housing of the apparatus, a ribbon display portion $48_2$ for displaying various existent states relative to whether or not a ribbon is fitted into a ribbon cassette to be set in the housing 1 of the apparatus, whether or not the cassette is fitted therein or the like state, a paper display portion $48_3$ for displaying the existent state relative to whether or not the paper feeding cassette is set in position or whether papers are received in the paper feeding cassette 8, scanner display portions $48_4$ and $48_5$ for displaying the operative state of the scanner section 11 and an optical density display portion $48_6$ for displaying optical density predetermined by operation of the mode keys 45 and 46.

Figure 4:
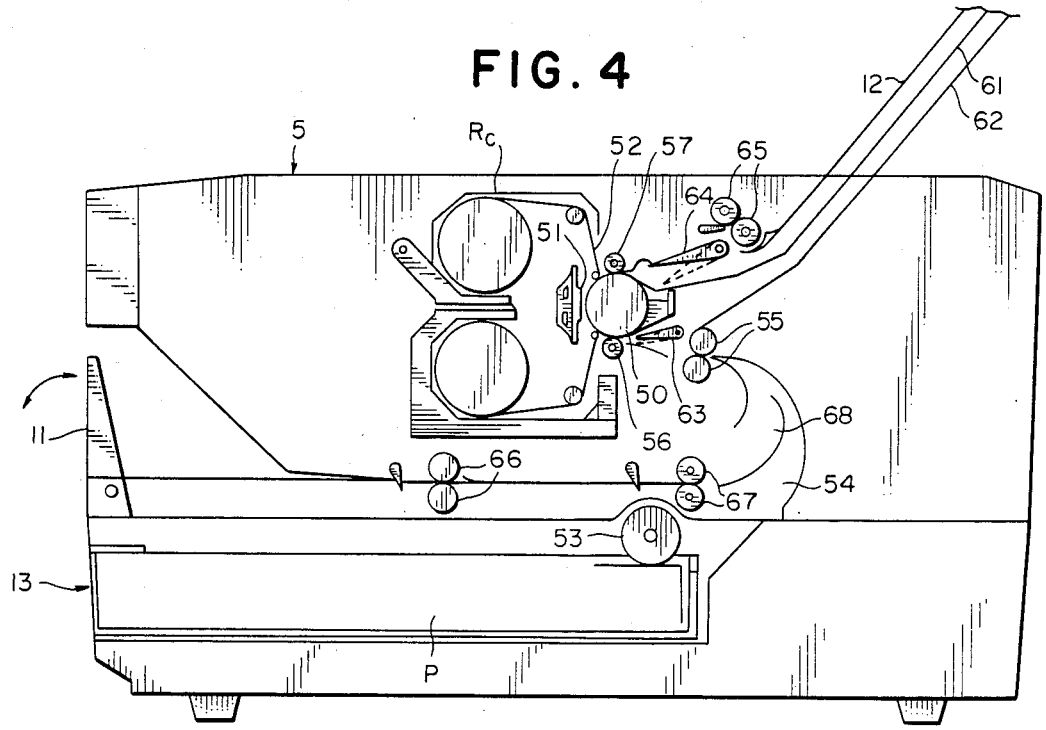
FIG. 4 is a schematic vertical sectional view of the apparatus, particularly illustrating how an image building section is constructed.

Next, the image building section 5 is constructed as illustrated by way of a vertical sectional view in FIG. 4. Specifically, a platen 50 is located at the approximately central position of the image building section 11 and a thermal head 51 serving as a recording head is disposed at a position located in front of the platen 50 (leftwardly of the platen 50 as seen in FIG. 4) in such a manner that it comes in contact with the latter and moves away therefrom.

It should be noted that the thermal head 51 is so located that it is accommodated in the space as defined by a ribbon cassette $R_c$ and a thermal transfer ribbon (ink ribbon) 52 is interposed between the platen 50 and the thermal band 51. While the thermal transfer ribbon 52 is interposed therebetween, paper P is thrusted against the platen 50 and ink on the thermal transfer ribbon 52 is then transferred onto paper P in the molten state by activating a number of heating elements (not shown) arranged on the thermal head 51 in the line dot shaped pattern.

As illustrated in the drawing, a paper feeding roller 53 is located below the platen 50 in order to take out papers P received in the paper feeding cassette 13 as printing medium one by one therefrom. Thus taken paper P is brought to a pair of register rollers 55 via a paper guiding passage 54. As is apparent from the drawing, the register rollers 55 are disposed approximately above the paper feeding roller 53 so as to assure correct orientation of the leading end of paper P. Thereafter, paper P is displaced toward the platen 10 to assume the operative state where it is partially wound about the platen 50.

Figure 5:
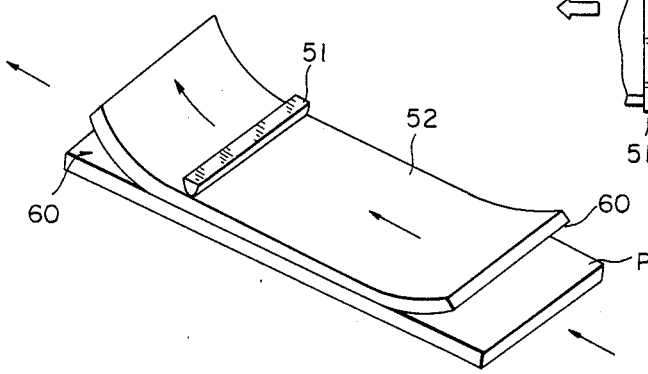
FIG. 5 is a schematic perspective view, particularly illustrating how thermal transferring operation is performed.

When paper P is partially wound about the platen 50, the thermal head 51 is displaced to thrust paper P against the platen 50 with both paper P and thermal transfer ribbon 52 interposed therebetween as schematically illustrated in FIG. 5 whereby ink 60 on the thermal transfer ribbon 52 is transferred onto paper P in the molten state.

Next, description will be made as to the thermal transfer ribbon 52 below. As typically illustrated in FIG. 6, it includes three ink sections 60a, 60b and 60c in the area I, wherein the ink section 60a is allocated to a color of yellow (Y), the ink section 60b is allocated to a color of magenta (M) and the ink section is allocated to a color of cyan (C). Alternatively, it may include four ink sections 60a, 60b, 60c and 60d arranged in the area II, wherein the ink section 60a is allocated to a color of yellow (Y), the ink section 60b is allocated to a color of magenta (M), the ink section 60c is allocated to a color of cyan (C) and the ink section 60d is allocated to a color of black (B). Color transferring is effected in such a manner that paper P is restored to the initial position after completion of transference of one of all colors. Color transferring is repeatedly carried out in accordance with the predetermined order of color superimposition.

Figure 6:
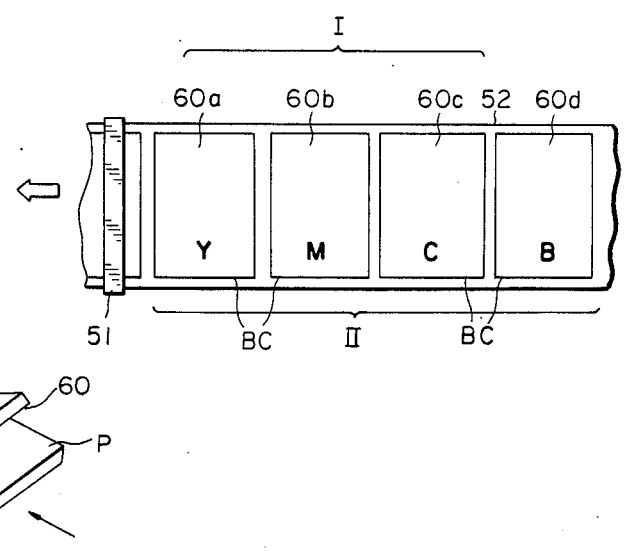
FIG. 6 is a plan view of a thermal transfer ribbon, particularly illustrating how a plurality of ink sections are arranged one after another in the longitudinal direction.

As shown on the lower part of FIG. 6, bar code BC is attached to the lower edge of each of the color sections 60a to 60d on the thermal transfer ribbon 52 in order to identify color on each of the ink sections 60a to 60d and align the foremost end of each of the ink sections 60a to 60d with the leading end of paper P. The existence of bar code BC is detected by means of a bar code sensor (as identified by reference numeral 78 in FIG. 8) which will be described later.

Incidentally, the black ink section 60d is used in the case where there is a necessary for clearly exhibit a color of black. However, it should be added that a color very close to real black can be produced by superimposing three colors one above another without any use of the black ink section 60d.

Thus, paper P is reciprocably displaced by the number of times equal to that of colors to be printed by rotating the platen 50 in both the directions. During reciprocable displacing of paper P it is brought onto one of first and second guides 61 and 62 which are disposed below the printed paper receiving tray 12. The first guide 61 is located just below the paper receiving tray 12 and the second guide 62 is located below the first one.

Figure 7A:
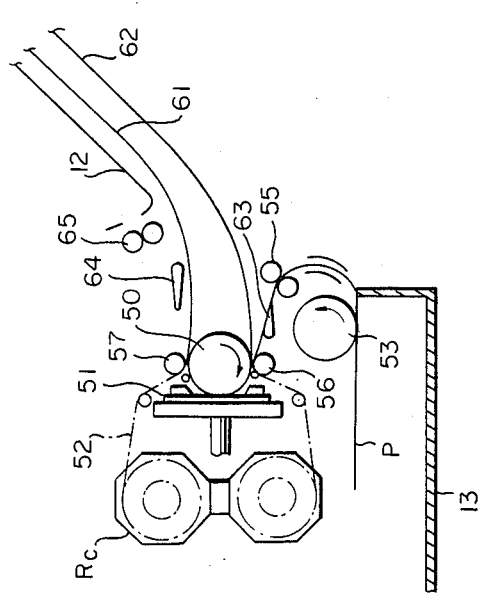
FIGS. 7(a) to (d) are a schematic fragmental vertical sectional view of the apparatus respectively, illustrating how paper is reciprocably displaced through the image building section when multi-color transferring is to be effected.

Description will be made as to how paper P is reciprocably displaced below with reference to FIGS. 7(a)

to (d) each of which is a schematic fragmental vertical sectional view of the apparatus. First, paper P is taken from the paper feeding cassette 13 and it is then displaced to the platen 50 via the pair of register rollers 55 and the first distributing gate 63 so that it is partially wound about the platen 50 (see FIG. 7(a)).

Next, the platen 50 is rotated by means of a pulse motor (not shown) which serves as a driving power source so that paper P is transported at a predetermined speed. At this moment heating elements (not shown) arranged on the thermal head 51 in the line dot shaped pattern in the axial direction of the platen 50 are heated up in response to image informations whereby ink 60 on the thermal transfer ribbon 52 is transferred onto paper P in the molten state.

Figure 7B:
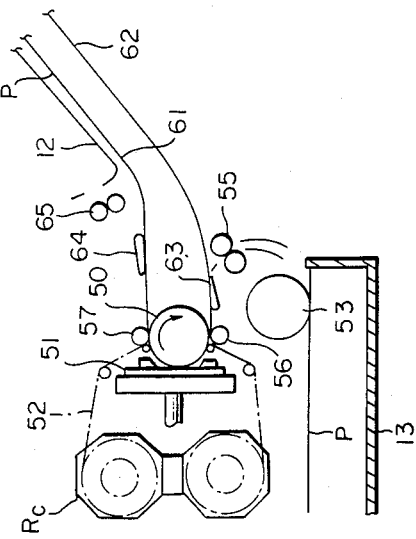
Figure 7C:
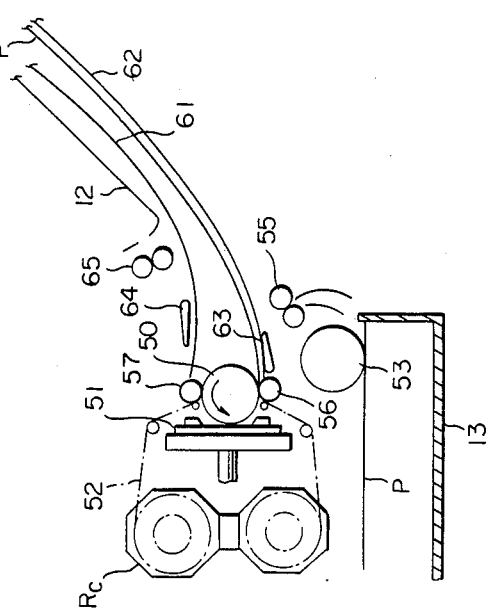

Then, the leading end of paper P which has moved past the platen 50 is delivered onto the first guide 61 disposed below the paper receiving tray 12 via the second distributing gate 64 (see FIG. 7(b)).

After completion of transference of ink 60 having one of the colors, the thermal transfer ribbon 52 is displaced by a distance equal to the length of one ink section so that the rearmost end of the next ink section is aligned with the tail end of paper P. As the platen 50 is rotated in the reverse direction, thermal transferring is effected in the reverse manner and it is then delivered onto the second guide 62 disposed below the first guide 61 via the first distributing gate 63 which has been turned to the illustrated position (see FIG. (c)).

Thus, thermal transference of plural colors is achieved by reciprocably displacing paper P by plural times in the above-described manner.

Figure 7D:
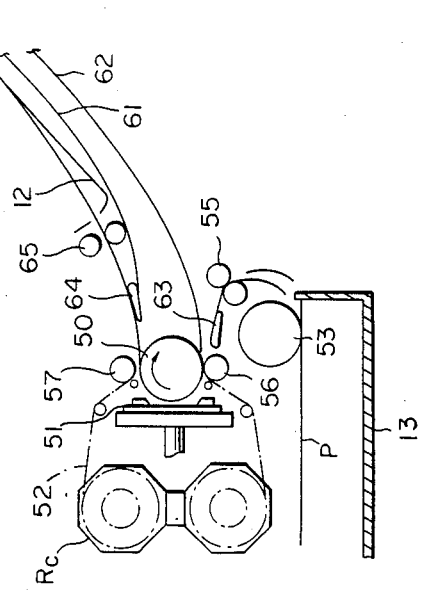

Finally, paper P onto which inks 60 of all colors have been transferred in that way is brought to a pair of discharging rollers 65 via the second distributing gate 64 and it is then discharged onto the paper receiving tray 12 by means of the paper discharging rollers 65 (see FIG. 7(d)).

Referring to FIG. 4 again, a pair of rollers 66 and 67 are intended to feed paper by manual operation, and paper which has been transported by means of the rollers 66 and 67 is brought to the pair of register rollers 55 via a guide passage 68.

Next, description will be made below as to how the image building section 5 is constructed. Regarding to FIGS. 8 to 10, a printer block 71 is designed in the substantially same configuration as the outer configuration of the ribbon cassette Rc. A head holder 72 adapted to support the thermal head 51 from the rear side while serving as a heat radiating plate, a pair of ribbon guides 73 integrally secured to the head holder 72, rods 75 each having one end thereof attached to the head holder 72 and the other end connected to driving links 74, a rotary shaft 76 for the driving links 74, coil springs 77 adapted to turn the links 74 in the clockwise direction as seen in the drawings under the effect of their resilient force to displace the thermal head toward the platen 50 by way of the rods 75 and a bar code detector 78 comprising light emitting element and light receiving element to detect the existence of bar code attached to the thermal transfer ribbon (ink ribbon) 52 are accommodated in the printer block 71.

Figure 8:
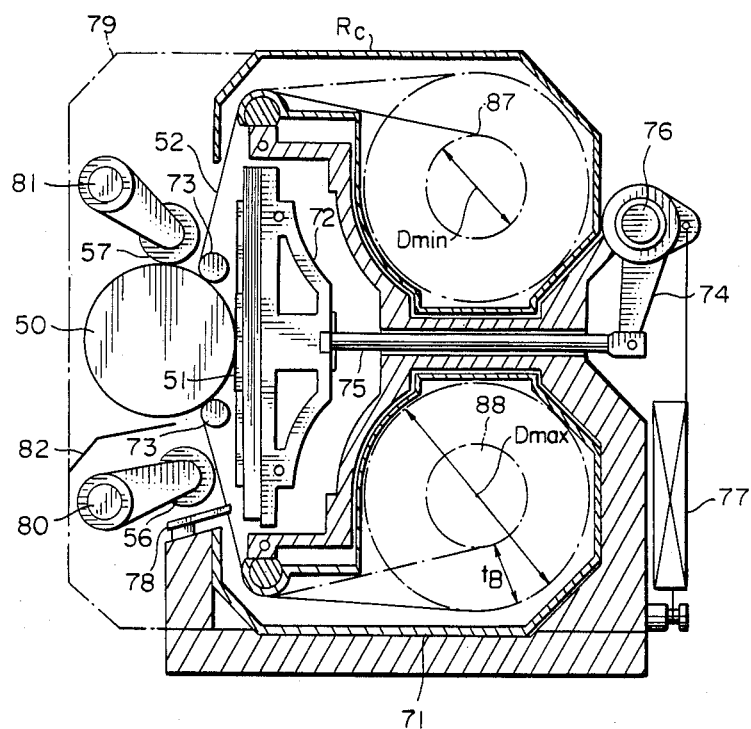
FIG. 8 is a vertical sectional view of the image building section.
Figure 9:
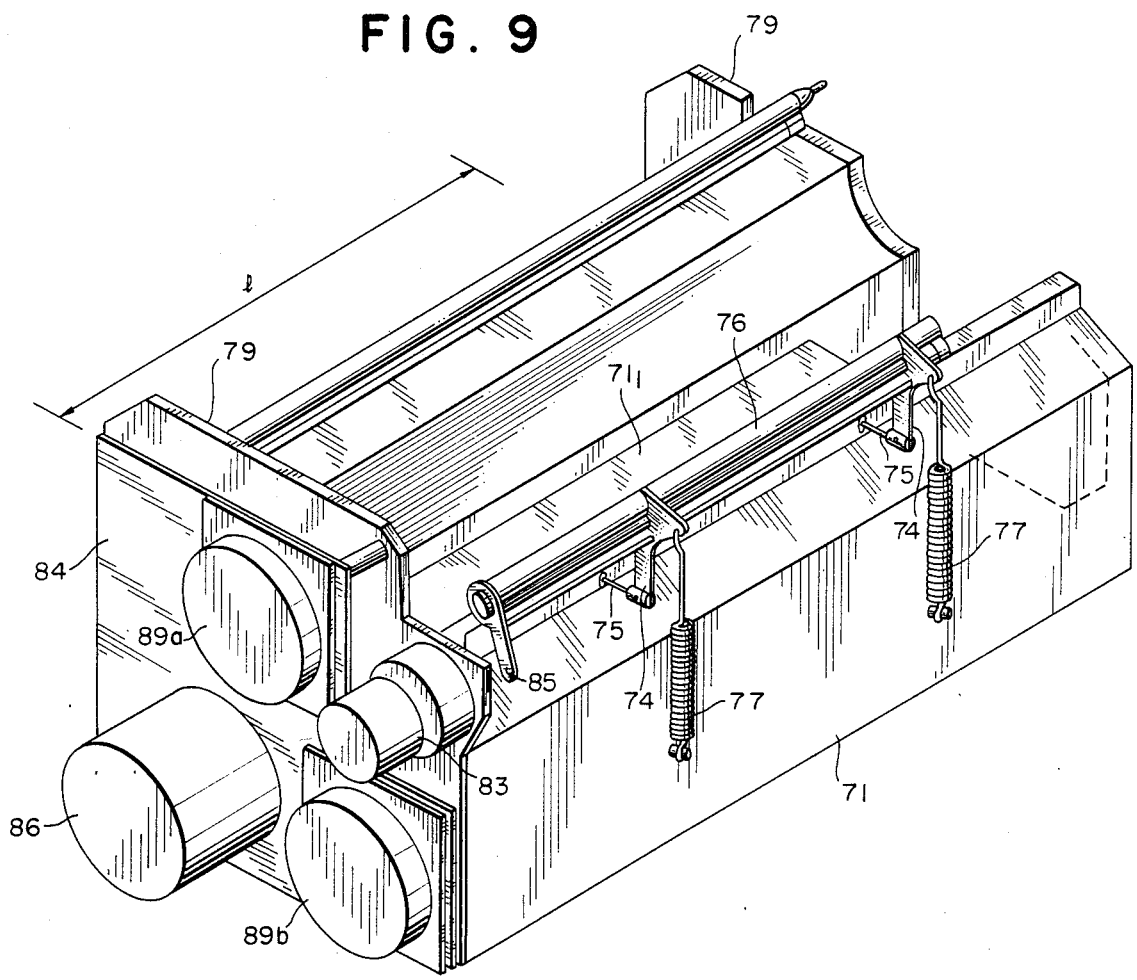
FIG. 9 is a perspective view of the image building section.
Figure 10:
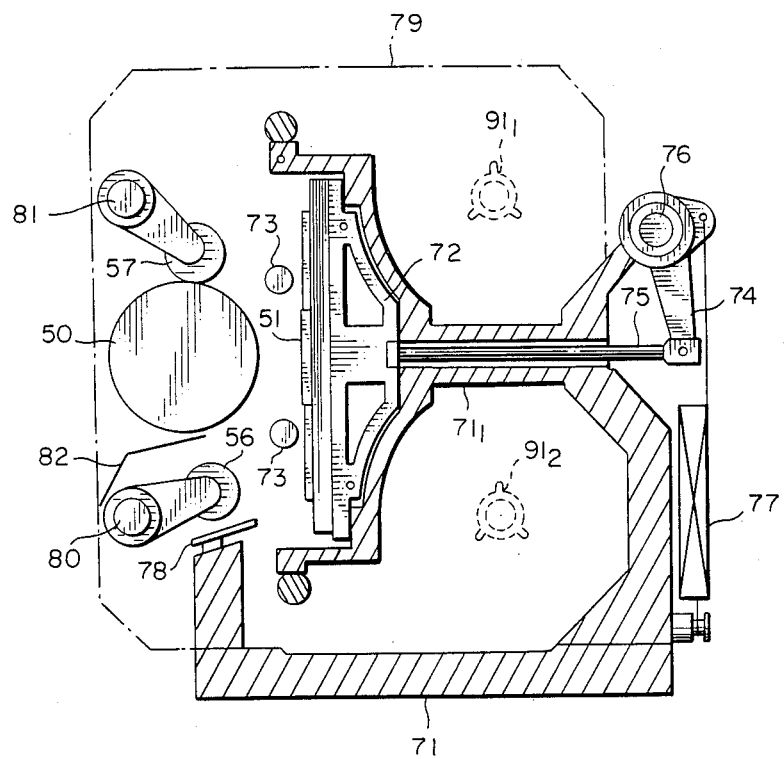
FIG. 10 is a vertical sectional side view of the image building section similar to FIG. 8 with the thermal transfer ribbon removed therefrom.

The platen 50 is secured to both frames 79 which are attached to both the side walls of the printer block 71. As is best seen from FIG. 10, support shafts 80 and 81 for pressure rollers 56 and 57 adapted to thrust paper against the platen 50 are mounted on both the frames 79 while extending therebetween. The pressure rollers 56 and 57 are operated by activating solenoids which are not shown in the drawings. A paper guide 82 is disposed in the area as defined between the pressure roller 56 and the platen 50. Further, as illustrated in FIG. 9, a motor 83 for displacing the thermal head 51 and another motor 84 are fitted to the one frame 79. A rotary shaft extending from the motor 83 which is not shown in the drawings has a cam fixedly secured thereto whereby the lever 85 on the rotary shaft 76 is caused to turn as the motor 83 is driven. Thus, the thermal head 51 is displaced away from the platen 50 against the resilient force of the coil springs 77. Further, a platen driving motor 86 as well as ribbon driving motors 89a and 89b for rotating cores 87 and 88 (see FIG. 8) for the thermal transfer ribbon (ink ribbon) 52 accommodated in the ribbon cassette Rc are mounted on the motor frame 84. These motors 86, 89a and 89b are adapted to rotate the platen 50 and the cores 87 and 88 in the ribbon cassette Rc by way of gears which are not shown in the drawings. Among these gears, the gears adapted to rotate the cores 87 and 88 are formed with engagement projections $91_1$ and $92_2$ at their center of rotation as illustrated in FIG. 10. Thus, it is possible to run the thermal transfer ribbon 52 in both the normal and reverse directions by controlling the motors 89 and 90.

Incidentally, each of the motors 89a and 89b is constructed by a combination of a rotor having a disc-shaped configuration with a plurality of permanent magnets arranged therearound, the aforesaid permanent magnets having alternate magnetic polarity, and a stator with a plurality of coils located opposite to the permanent magnets on the rotor, and a hole element group generally comprising three hole elements is disposed between the adjacent coils in order to detect the existing rotational position assumed by the rotor.

Figure 11:
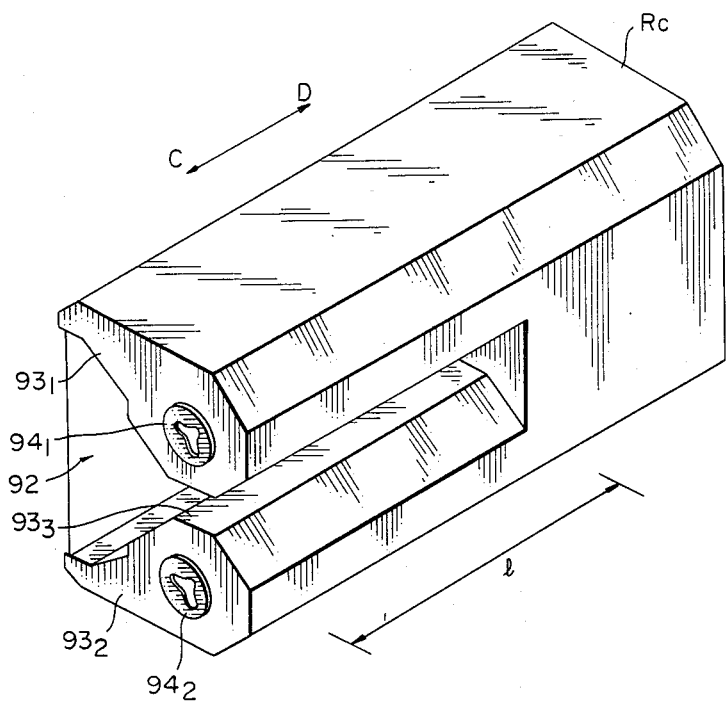
FIG. 11 is a perspective view of the thermal transfer ribbon cassette, particularly illustrating how it is constructed with respect to its dimensions.

The ribbon cassette Rc is removably fitted into the printer block 71. Specifically, the ribbon cassette Rc is designed in the substantially U-shaped sectional configuration so as to build a hollow space 92 in the area as defined between the rear side of the exposed part of the thermal transfer ribbon 52 and the ribbon cassette Rc in which the holder 72, the ribbon guide 73 and the thermal head 51 are accommodated, as illustrated in FIG. 11. Further, the ribbon cassette Rc is formed with a slit $93_3$ between both core holding portions $93_1$ and $93_2$ whereby the fitting portion $71$ of the printer block 71 (see FIGS. 9 and 10) can be fitted into the slit $93_3$. The depth of the slit $93_3$ is determined substantially same as the length l of the fitting portion $71_1$. In the illustrated embodiment the length l of the fitting portion $71_1$ is determined more than a half of the width of the thermal transfer ribbon 52. Thus, the ribbon cassette Rc can be fitted to the printer block 71 or can be removed therefrom as required by displacing the ribbon cassette Rc relative to the printer block 71 in the longitudinal direction (in the direction as identified by an arrow mark C or D in FIG. 11). Further, engagement recesses $94_1$ and $94_2$ which are operatively associated with the cores 87 and 88 in both the core holding portions $93_1$ and $93_2$ are provided on the front side walls of the latter whereby the engagement projections $91_1$ and $91_2$ are brought in engagement to the engagement recesses $94_1$ and $94_2$ when the ribbon cassette Rc is fitted to the printer block 71. As the thermal head 51 is displaced toward the platen 50 while the ribbon cassette Rc is fitted to the printer head 71, the thermal transfer ribbon 52 comes in contact with the platen 50 with the aid of the ribbon guides 73, as illustrated in FIG. 8. As will be readily understood, paper which is not shown in the drawing is interposed between the platen 50 and the thermal transfer ribbon 52 and ink on the thermal transfer ribbon 52 is transferred onto paper in the molten state by activating the thermal head 52 in response to image informations.

Figure 12:
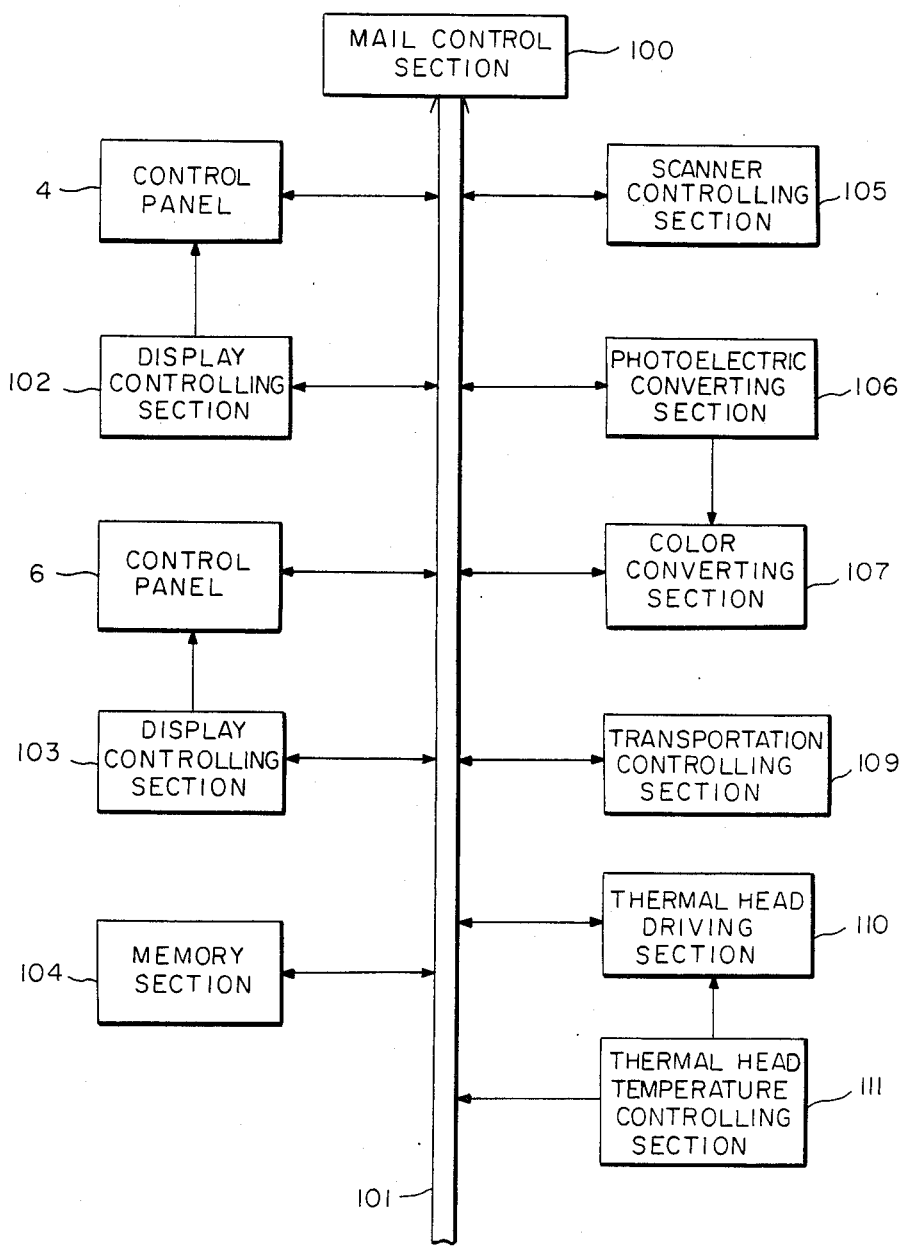
FIG. 12 is a block diagram schematically illustrating a control system for the apparatus.

FIG. 12 is a block diagram which schematically illustrates the whole control system for the apparatus. Specifically, a main control section 100 is constituted, for instance, by a combination of a central processing unit and associated components which are electrically connected to the former by way of a bus line 101. As is apparent from the drawing, a control panel 4 on the image information reading unit 2, a control panel 6 for the image building section 6, display controlling circuits 102 and 103 adapted to control both the control panels 4 and 6, a storing section 104, a scanner controlling section 105, a photoelectric converting section 106, a color converting section 107, a transportation controlling section 109, a thermal head driving section 110 and a thermal head temperature controlling section 111 are electrically connected to the bus line 101. The display controlling circuits 102 and 103 are activated in response to signals transmitted from the main control section 100 via the bus line 101 to control displays 48 and 10 on the control panels 4 and 6. Signals generated by handling the keys on the control panels 4 and 6 are transmitted to the main control section 100 via the bus line 101 so as to assure that required controlling is effected in response to thus generated signals. The storing section 104 is activated in response to signals transmitted from the main control section 100 via the bus line 101 so as to store ink color signals converted in the color converting section 107, read stores signals therefrom or for the like purpose.

On the other hands, the scanner controlling section 105 is activated in response to signals transmitted from the main control section via the bus line 101 so as to control the light sources 23 and the pulse motor 28 in the scanner section 21 and the photoelectric converting section 106. The photoelectric converting section 106 detects image on an original in response to signals transmitted from the main control section 106 via the bus line 101 so as to output light color signals which are modified in the digital form. The color converting section 107 converts light color signals outputted from the photoelectric converting section 106 into ink color signals for each of yellow, magenta, cyan and black so as to output thus converted color signals to the bus line 101. Further, the color converting section 107 is adapted to effect color converting also for signals delivered from the bus line 101 so that new signals are outputted to the bus line 101.

The transportation controlling section 109 is activated in response to signals transmitted from the bus line 101 so as to drive the motors 86 for rotating the platen 50, the motors 89 and 90 for rotating the cores 87 and 88 in the ribbon cassette Rc, motors for rotating the register rollers 55, the paper discharging rollers 65 and others and solenoid (not shown) for turning the first and second distributing gates 63 and 64. The thermal head driving section 110 is activated in response to signals transmitted from the main control section 100 via the bus line 101 as well as signals transmitted from the thermal head temperature controlling section 111 so as to control heating elements on the thermal head 51. Finally, the thermal head temperature controlling section 111 is activated in response to signals transmitted from the main control section 100 via the bus line 101 so as to output temperature controlling signals to the thermal head driving section 110.

Next, description will be made below as to a thermal transfer ribbon driving control circuit with reference to FIG. 13.

As illustrated in the drawing, the processing unit 181 is constructed, for instance, in the form of a microcomputer to which a plunger driving section 182 for the purpose of actuating a plunger 123 and the bar code sensor 78 as described above are electrically connected. Further, a read only memory (hereinafter referred to simply as ROM) 183 in which control informations from the ribbon driving motors 89a and 89b are stored, a counter 185 for detecting the number of revolutions of the ribbon driving motor 89a and D/A convertors 186a and 186b to which control informations read from ROM 183 are delivered are electrically connected to the processing unit 181. The processing unit 181 is so constructed that signals are delivered to the main control section 100 which has been described with reference to FIG. 12 and received from the same in order to carry out a variety of controls. Specifically, the counter 185 is reset in response to output signals from the bar code sensor 78 so as to output start-stop signals and moreover it reads required control informations from ROM 183 in dependence on the number of counts which is delivered from the counter 185 so that thus read control informations are delivered to D/A convertors 186a and 186b.

The counter 185 is intended to count pulse signals in response to start signal delivered from the processing unit 181, the aforesaid pulse signals being outputted from the hole element group 178a comprising three hole elements, and counting operation is completed by stop signal which is outputted from the processing apparatus 181. After completion of counting operation the number of counts is delivered to the processing unit 181.

Incidentally, the following relations are established between the residual amount of thermal transfer ribbon 52 and the number of counts. Namely, when it is assumed that a distance between the adjacent bar codes BC on the thermal transfer ribbon 52 is represented by $l_B$ and the radius of thermal transfer ribbon on the unwinding side is by $r_a$ and the radius of thermal transfer ribbon on the winding side is by $r_b$, as illustrated in FIGS. 14(a) and (b), the number $n_a$ of revolutions of the motor 89a on the unwinding side and the number $n_b$ of revolutions of the motor 89b on the winding side during displacing of the thermal transfer ribbon 52 by the distance $l_B$ are represented by the following formulas respectively.

$$n_a = \frac{l_B}{2\pi r_a} \qquad (2)$$

$$n_b = \frac{l_B}{2\pi r_b}$$

Further, when it is assumed that the number of pulses outputted from the hole element group comprising three hole elements during one rotation of both the motors 89a and 89b for driving the thermal transfer ribbon 52 is represented by $C_o$, the number of pulses obtained during rotation of the motors 89a and 89b by the number of revolutions $n_a$ and $n_b$ is represented by the following formulas.

$$C_a = C_o n_a = \frac{l_B}{2\pi r_a} \quad (3)$$

where $C_a$ designates the number of pulses on the unwinding side.

$$C_b = C_o n_b = C_o \frac{l_B}{2\pi r_b} \quad (4)$$

where $C_b$ designates the number of pulses on the winding side. Accordingly, the radius $r_a$ as measured on the unwinding side at this moment and the radius $r_b$ as measured on the winding side at this moment are represented by the following formulas.

$$r_a = \frac{l_B C_o}{2\pi C_a} \quad (5)$$

$$r_b = \frac{l_B C_o}{2\pi C_b} \quad (6)$$

Since B and $C_o$ in the formulas (5) and (6) are a constant respectively, the existent radius of the thermal transfer ribbon 52 on both the sides, that is, ribbon radius $r_a$ on the unwinding side or ribbon radius $r_b$ on the winding side can be detected in dependence on the number of pulses $C_a$ or $C_b$. Thus, torque generated by the motors 89a and 89b can be controlled by reading control informations of the motors 89a and 89b from ROM 183 corresponding to the number of pulses $C_a$ and $C_b$.

Next, description will be made below as to controlling of the motors 89a and 89b. As is apparent from FIG. 15, control informations of the motors 89a and 89b corresponding to the number of counts counted by the counter 183 are stored in ROM 183. Control informations vary in dependence on the existing operative state during transferring operation, during reverse displacing of the thermal transfer ribbon, during stoppage of the latter and during displacing of the same without any thrusting force exerted thereon to be transmitted to the platen. Thus, they are prepared in dependence on the number of counts as counted at each of the operative states. Specifically FIG. 15(a) illustrates how control informations are stored during transferring operation, FIG. 15(b) illustrates how they are stored during reverse displacing of the thermal transfer ribbon FIG. 15(c) illustrates how they are stored during stoppage of the same and FIG. 16(d) illustrates how they are stored during displacing of the same without any thrusting force exerted thereon. These control informations are so prepared that the thermal transfer ribbon 52 is driven with a certain constant torque in accordance with the existing radius of the thermal transfer ribbon, that is, the residual amount of the latter. It should be noted that in FIG. 15 control informations are represented by way of hexadecimal notation. In the drawing reference letters OH designate the maximum torque and reference letters FH do the minimum torque.

Figure 13:
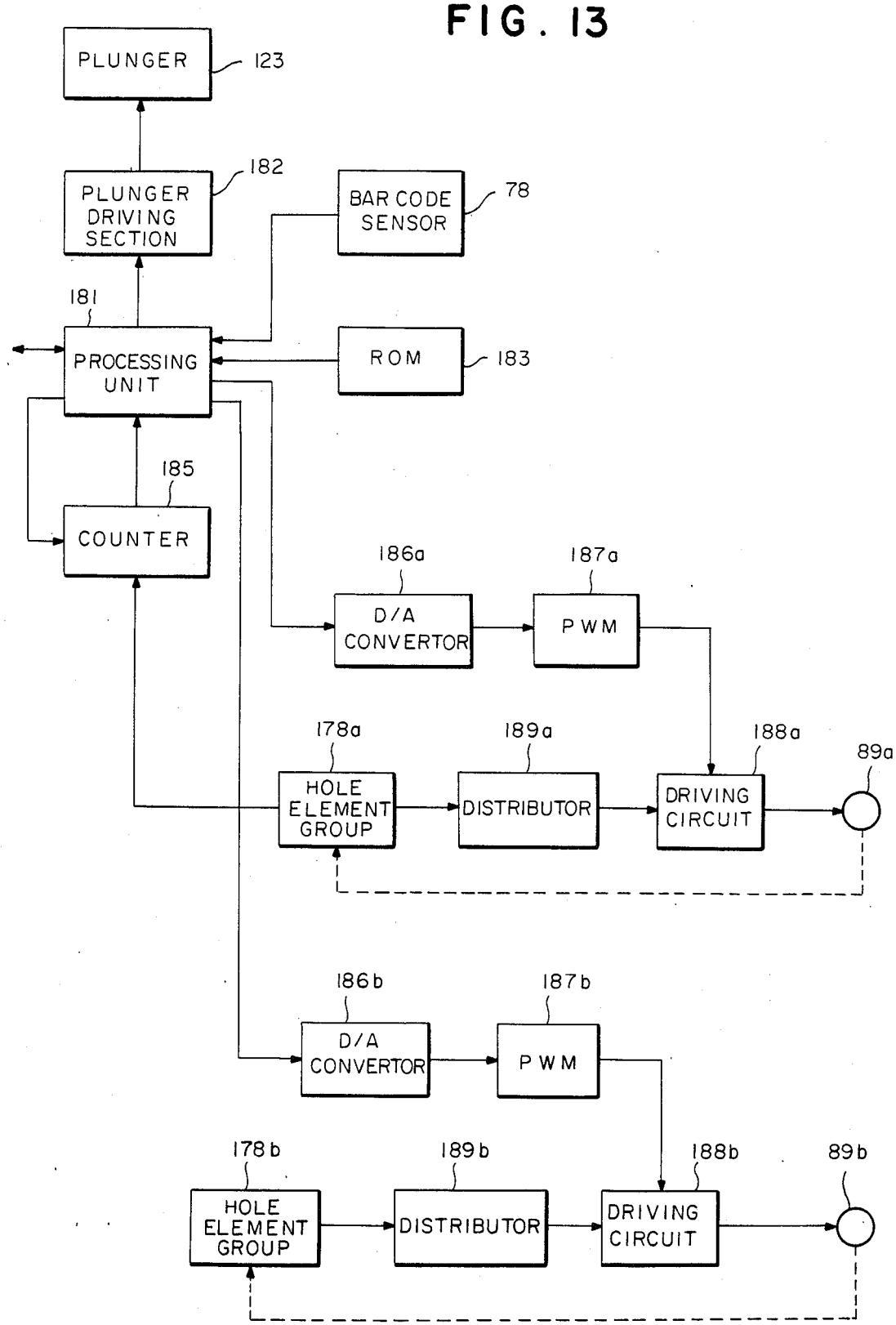
FIG. 13 is a block diagram schematically illustrating a thermal transfer ribbon driving control circuit.

Control informations read from ROM 183 in dependence on the number of counts counted by the counter 185 as illustrated in FIG. 13 are delivered to D/A converters 186a and 186b. Analogue signals outputted from D/A convertors 186a and 186b corresponding to the above-mentioned control informations are then delivered to pulse width modulators (hereinafter referred to simply as PWM) 187a and 187b. Specifically, PWM 187a and 187b are adapted to generate pulse signals of which the duty ratio varies in dependence on the voltage of the inputted analogue signals and they are constituted, for instance, by a combination of a series connected wave generator and comparator. Output signal from PWM 187a and 187b are delivered to their associated driving circuits 188a and 188b. Further, output signals from the hole element groups 178a and 178b for the motors 89a and 89b each of which is constructed by three hole elements are delivered to their associated distributors 189a and 189b. The distributors 189a and 189b are adapted to generate phase switching signals in response to rotor position detecting signals outputted from the hole element groups 178a and 178b and each of the distributors 189a and 189b is typically constructed by a combination of a comparator to which an output signal from each of the hole elements constituting the hole element groups 178a and 178b and an electric current switching circuit to which an output signal from the comparator is delivered. A phase switching signal outputted from the distributors 189a and 189b is delivered to the driving circuits 188a and 188b. The driving circuits 188a and 188b are adapted to control coil current of the ribbon driving motors 89a and 89b in response to phase switching signal and the intensity of coil current is determined in dependence upon the on time of pulse signal outputted from PWM 187a and 187b. It should be noted that the ribbon driving motors 89a and 89b are driven by an output signal from the driving circuits 188a and 188b.

To facilitate understanding of the structure of a small volume type ribbon cassette constituting an essential component according to the present invention it will be helpful to describe how a typical conventional ribbon cassette is constructed with reference to FIG. 18.

Figure 16:
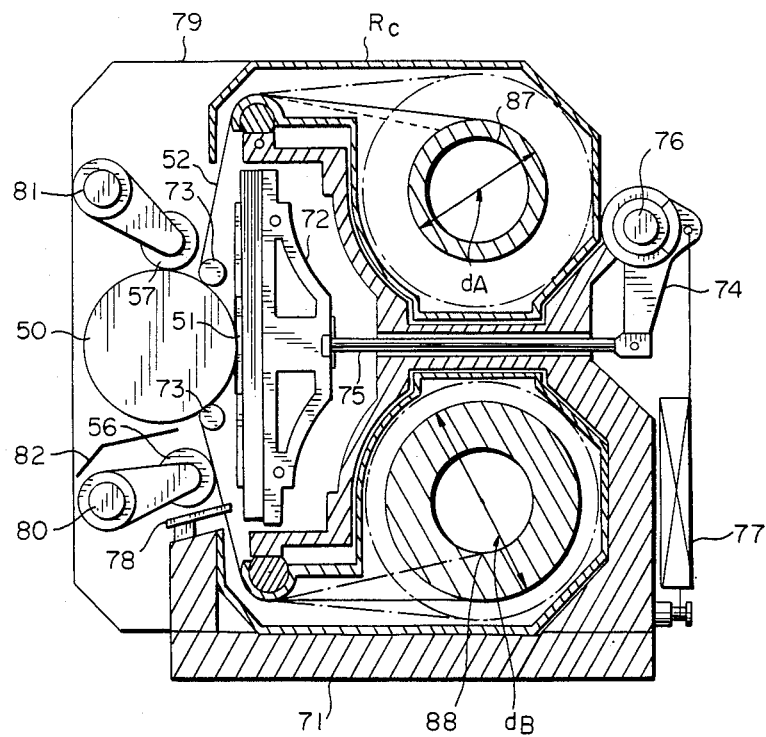
FIG. 16 is a vertical sectional side view of the image building section, particularly illustrating how a conventional thermal transfer ribbon cassette is fitted to the image building section.
Figure 18A:
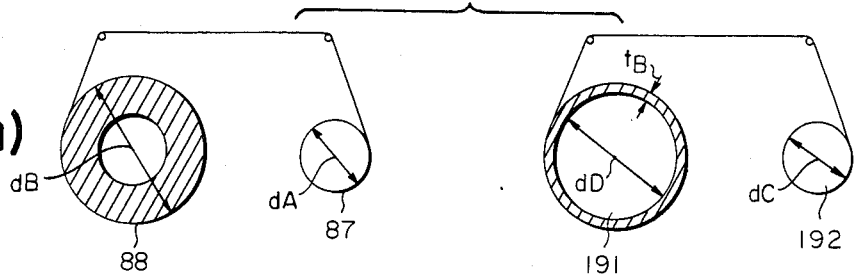
FIGS. 18(a) to (c) are a schematic side view of a thermal transfer ribbon cassette respectively, wherein the left part of the drawings illustrates how a conventional thermal transfer ribbon cassette is used and the right part of the same illustrates how a small volume type thermal transfer ribbon cassette is used.
Figure 18B:
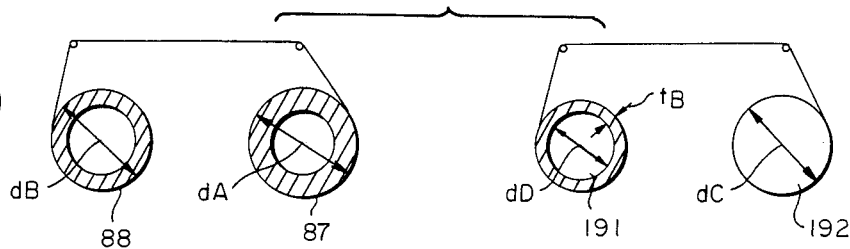
Figure 18C:
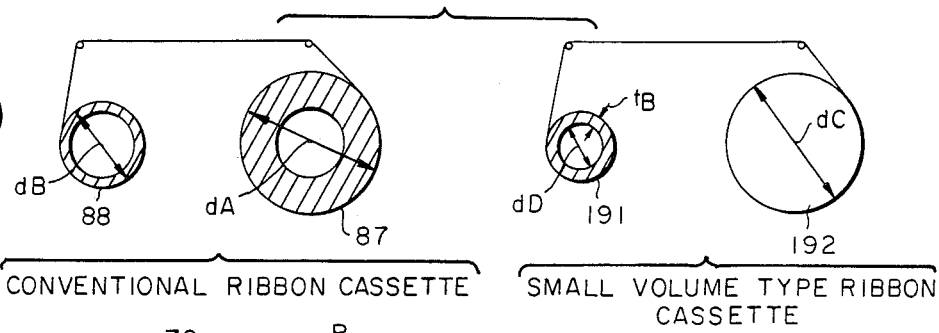

The conventional ribbon cassette is generally constructed as illustrated at the left half of FIGS. 18(a) to (c). When the ribbon cassette Rc is held in the unused state, the full length of the thermal transfer ribbon 52 is wound about the core 88 whereby the diameter of ribbon coil assumes the maximum value of $D_{max}$. At this moment a very short length of the thermal transfer ribbon 52 is wound about the core 87 and the diameter of ribbon coil assumes the minimum value of $D_{min}$. When the thermal transfer ribbon 52 is fully used, the relation between both the maximum and minimum diameters is reversed in such a manner that the core 87 has the maximum diameter and the core 88 does the minimum diameter. FIG. 16 is a sectional view of the image building section in the apparatus, particularly illustrating how the thermal transfer ribbon 52 is wound about the cores 87 and 88 in the course of transferring operation, wherein ribbon on the core 87 assumes a diameter of dA and ribbon on the core 88 has a diameter of dB as represented by solid lines in the drawing. A thickness of the wound structure of thermal transfer ribbon 52 on the cores 87 and 88 can be represented by the following formula (see FIG. 8).

$$(D_{max} - D_{min})/2$$

Figure 17:
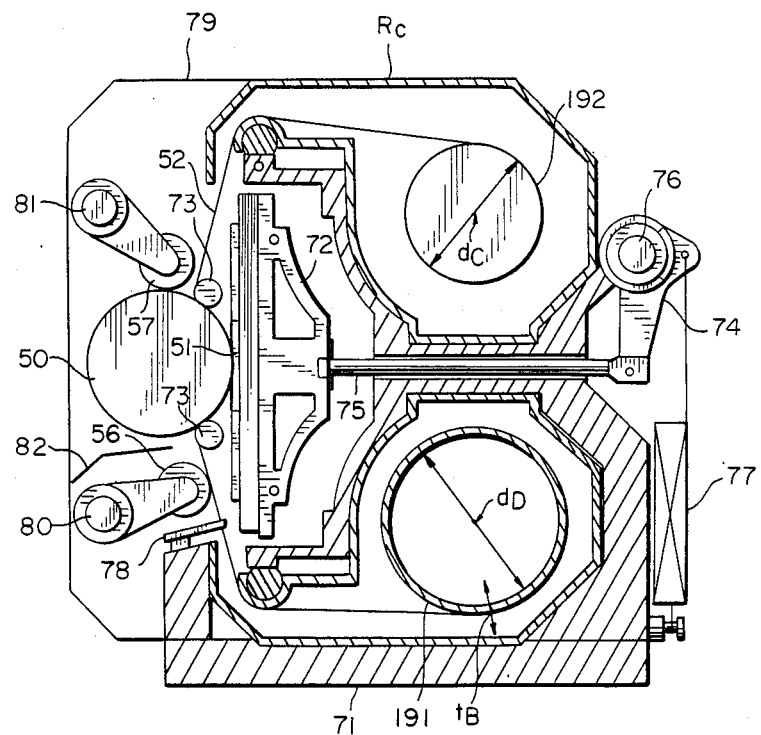
FIG. 17 is a vertical sectional side view of the image building section, particularly illustrating how a small volume type thermal transfer ribbon cassette of the invention is fitted to the image building section.

On the other hands, FIG. 17 is a sectional view of the image building section in the apparatus, particularly illustrating the small volume type ribbon cassette of the present invention on which a considerably short length of thermal transfer ribbon is wound on both the cores. As is apparent from the drawing, a thickness $t_b$ of the wound structure of thermal transfer ribbon 52 on the core 191 in the unused state is remarkably reduced, compared with that of the conventional ribbon cassette in FIG. 8.

When diameters dD and dC of the cores 191 and 192 in the small voltage type ribbon cassette of the invention are to be determined, consideration is taken such that dC of the core 192 is identical to dA on the core 87 in the conventional ribbon cassette which is assumed at a certain wound state of the thermal transfer ribbon 52 (see FIG. 16) and a diameter of the wound structure of thermal transfer ribbon in the unused state, that is, dD+2t$_B$ is identical to dB on the core 88 in the conventional ribbon cassette which is assumed at the above-mentioned wound state. Namely, the following relation (7) is established among diameters of cores in both the small volume type ribbon cassette of the invention and the conventional ribbon cassette.

$$dC = dA \qquad (7)$$

$$dB = dD + 2\, t_B$$

FIG. 18 schematically illustrates the relation among diameters of cores in the above-mentioned two ribbon cassettes. Specifically, the left half of the drawing illustrates three operative states of the conventional ribbon cassette, wherein FIG. 18(a) illustrate the unused state of thermal transfer ribbon, FIG. 18(b) illustrates the intermediate state of the same and FIG. 18(c) illustrates the final state where a small amount of thermal transfer ribbon is wound about the core 88. As is apparent from the drawings, diameters dA and dB of the wound structure on both the cores 87 and 88 vary in dependence on the existing operative state. On the other hands, in the case of the small volume type ribbon cassette of the invention as illustrated at the right half of FIG. 18, diameters of dD and dC are determined so as to establish the relation as represented by formula (7).

Namely, when core diameter and thickness of the wound structure in the small volume type ribbon cassette of the invention are to be determined, consideration is taken such that core diameters in the small volume type ribbon cassette as measured at a certain would state are identical to diameter of dA and dB which are assumed by the conventional ribbon cassette at the above-mentioned wound state.

As will be readily understood from the above description, it is possible to allow diameters of the wound structure on the cores 87 and 88 in the conventional ribbon cassette to be identical to diameters of the wound structure on the cores 191 and 192 in the small volume type ribbon cassette of the invention. Accordingly, even when any one of these ribbon cassettes is fitted to the image building section 5, rotational speed as measured on the wound structure (diameter of the wound structure) can be accurately detected without any necessity for changing or modifying the control mechanism for driving the ribbon cassette as described above with reference to FIGS. 13 to 15 as well as the content of control informations for both the motors 89a and 89b stored in ROM 183. Further, tension of the thermal transfer ribbon 52 can be kept constant without any occurrence of dislocation of paper from the predetermined position, wrinkling of paper or the like malfunction.

Since the small volume type ribbon cassette of the invention can be produced at a cheaper cost than the conventional ribbon cassette, a requirement for bringing back an used thermal transfer ribbon for the purpose of protecting leakage of secret items can be met satisfactorily at an inexpensive cost.

Figure 19:
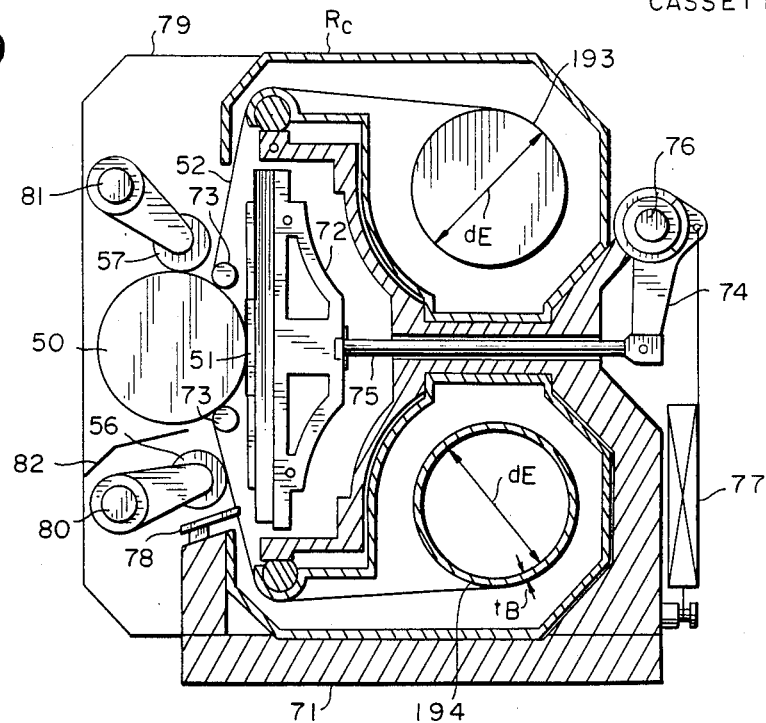
FIG. 19 is a vertical sectional side view of the image building section, particularly illustrating how a modified small volume type thermal transfer ribbon cassette of the invention is fitted to the image building section, wherein a diameter of both cores is determined same.

Next, description will be made as to another embodiment of the invention will reference to FIG. 19. Same or similar parts or components as those in the foregoing embodiment are identified by same reference numerals.

In this embodiment diameters of the cores 193 and 194 around which a short length of thermal transfer ribbon 52 is wound are determined to the same dimension of dE. Thus, when the thermal transfer ribbon 52 is caused to run in both the normal and reverse directions, the same torque condition is obtainable in both the running directions. In the case of color transfer recording the following requirements are raised.

(1) Reduction of useless transferring area where no transferring is effected.

(2) Reduction of dislocation of one color from another color.

(3) Possibility of transference in both the directions.

To meet the above requirements there is necessity for running the thermal transfer ribbon also in the reverse direction. However, an inequality of $T_A > T_B$ is established, provided that tension of the thermal transfer ribbon on the winding side is represented by $T_A$ and tension of the same on the unwinding side is represented by $T_B$. Due to existence of the above inequality, operative conditions should be reversed when the direction of running of the thermal transfer ribbon is reversed. Further, to assure that tension of the thermal transfer ribbon should be kept constant at all times irrespective of the direction of running of the thermal transfer ribbon there is a necessity for properly changing torque conditions of the motors 89a and 89b in dependence on the diameter of cores around which the thermal transfer ribbon is wound. For the reason tension of the thermal transfer ribbon cannot be maintained constant unless the torque condition is separately determined for each of both the normal and reverse directions, when the diameter of the cores in the ribbon cassette is changed. However, in this embodiment, since the diameter dE of both the cores 193 and 194 is determined to be the same, torque conditions can be maintained constant for each of both directions of running of the thermal transfer ribbon.

While the present invention has been described above with respect to a few preferred embodiments thereof, it should of course be understood that it should not be limited only to them but various changes or modifications may be made in any acceptable manner without departure from the spirit and scope of the invention as defined by the appended claims.

What is claimed is:

1. An image building apparatus comprising;
    a first ink donor medium holding means having first and second cores for holding a first ink donor medium, ends of said first ink donor medium being wound about said first and second cores while being spanned therebetween,
    a second ink donor medium holding means having third and fourth cores for holding a second ink donor medium ends of said second ink donor medium being wound about said third and fourth cores while being spanned therebetween, said second ink donor medium having a length shorter than that of the first ink donor medium,
    ink donor medium running control means for selectively mounting either one of said first and second ink donor medium holding means to control the running of the first or second ink donor medium accommodated in the respective first or second ink donor medium holding means thus selectively mounted thereto, printing medium running control means for controlling the running of a printing medium while it is juxtaposed adjacent said first or second ink donor medium in an overlapped state, and a recording head for transferring coloring agent on said first or second ink donor medium onto said printing medium while they are caused to run in the overlapped state whereby an image is built on said printing medium, wherein diameters of the third and fourth cores in said second ink donor medium holding means and a length of said second ink donor medium are so determined that the diameters of wound structures of said second ink donor medium about said third and fourth cores in the second ink donor medium holding means as measured at any given wound state thereof are equal respectively to diameters of the wound structures of the first ink donor medium about said first and second cores as measured at a certain wound state thereof.

2. An image building apparatus as defined in claim 1, wherein said first and second ink donor medium holding means are constructed in the form of a cassette which can be fitted to and removed from a housing of the image building apparatus.

3. An image building apparatus as defined in claim 1, wherein said ink donor medium comprises a sheet material on which thermally fusible or thermally sublimable ink serving as a coloring agent is coated and said recording head comprises a thermal head.

4. An image building apparatus as defined in claim 1, wherein said ink donor medium running control means comprises;

a motor operatively connected to at least one core in said first or second ink donor medium holding means mounted to said image building section so as to rotate said one core, pulse generating means for generating pulse signals in proportion to the number of revolutions of the motor, counting means for counting thus generated pulse signals, and controlling means for controlling the operative manner of the motor with reference to the count value of said counting means.

5. An image building apparatus as defined in claim 4, wherein said first and second ink donor mediums are each provided with a plurality of marks with an interval of a predetermined distance, and said controlling means is adapted to receive the counted value of said counting means in response to detection of the marks.

6. An image building apparatus as defined in claim 5, wherein each of said first and second ink donor mediums is constituted by a combination of plural ink sections having a predetermined length arranged one after another in the longitudinal direction, each of said ink sections being coated with a different coloring agent, and said marks comprise bar codes identifying the positions of said ink sections.

7. An image building apparatus as defined in claim 4, wherein said controlling means comprises;

a memory for storing motor controlling information according to the count value of said counter for each operational manner of said motor by utilizing the count value of said counting means as address information, and motor driving means for reading out said motor control information stored in said memory according to said count value so as to drive said motor in accordance with said motor control information thus read out.

8. An image building apparatus comprising;

first ink donor medium holding means having first and second cores for holding a first ink donor medium, ends of said first ink donor medium being wound about said first and second cores while being spanned therebetween, second ink donor medium holding means having third and fourth cores for holding a second ink donor medium ends of said second ink donor medium being wound about said third and fourth cores while being spanned therebetween, said second ink donor medium having a length shorter than that of the first ink donor medium, ink donor medium running control means for selectively mounting either one of said first and second ink donor medium holding means to control the running of the first or second ink donor medium accommodated in the respective first or second ink donor medium holding means thus selectively mounted thereto, printing medium running control means for controlling the running of a printing medium while it is juxtaposed adjacent said first or second ink donor medium in an overlapped state, and, a recording head for transferring coloring agent on said first or second ink donor medium onto said printing medium while they are caused to run in the overlapped state whereby an image is built on said printing medium, wherein a diameter of each of the third and fourth cores in the second ink donor medium holding means is the same.

9. An image building apparatus as defined in claim 8, wherein said first and second ink donor medium holding means are constructed in the form of a cassette which can be fitted to and removed from a housing of the image building apparatus.

10. An made building apparatus as defined in claim 8, wherein said ink donor medium comprises a sheet material on which thermally fusible or thermally sublimable ink serving as a coloring agent is coated and said recording head comprises a thermal head.

11. An image building apparatus as defined in claim 8, wherein said ink donor medium running control means comprises;

a motor operatively connected to at least one core in said first or second ink donor medium holding means mounted to said image building section so as to rotate said one core, pulse generating means for generating pulse signals in proportion to the number of revolutions of the motor, counting means for counting the generated pulse signals, and controlling means for controlling the operative manner of the motor with reference to the count value of said counting means.

12. An image building apparatus as defined in claim 11, wherein said first and second ink donor mediums are each provided with a plurality of marks with an interval of a predetermined distance, and said controlling means is adapted to receive the counted value of said counting means in response to detection of the marks.

13. An image building apparatus as defined in claim 12, wherein each of said first and second ink donor mediums is constituted by a combination of plural ink sections having a predetermined length arranged one after another in the longitudinal direction, each of said ink sections being coated with a different coloring agent, and said marks comprise bar codes identifying the positions of said ink sections.

14. An image building apparatus as defined in claim 13, wherein said controlling means comprises;
   a memory for storing motor controlling information according to the count value of said counter for each operational manner of said motor by utilizing the count value of said counting means as address information, and
   motor driving means for reading out said motor control information stored in said memory according to said count value so as to drive said motor in accordance with said motor control information thus read out.

15. An ink donor cassette including an ink donor medium for use in an image building apparatus wherein ink on said ink donor medium is transferred onto a printing medium by means of a recording head so as to build a reproduced image on the printing medium, comprising:
   an ink donor medium having a length shorter than that of a standard ink donor medium included in a standard type cassette;
   a pair of cores each engaging a respective end portion of the ink donor medium for winding the ink donor medium, thereby feeding the ink donor medium; and
   a case for accommodating the pair of cores and the ink donor medium,
   wherein diameters of the respective cores and a length of the ink donor medium are so determined that the diameters of wound structures of the short ink donor medium about said cores as measured at any wound state are equal to diameters of the corresponding wound structures of a standard ink donor medium about corresponding cores of the standard type cassette as measured at a certain wound state thereof.

16. An image building apparatus as defined in claim 1, wherein said ink donor medium comprises a sheet material on which thermally fusible or thermally sublimable ink serving as a coloring agent is coated and said recording head comprises a thermal head.

* * * * *